United States Patent [19]

Hinotani et al.

[11] 4,183,351
[45] Jan. 15, 1980

[54] SOLAR HEAT COLLECTING APPARATUS

[75] Inventors: Katsuhiro Hinotani, Shijyonawate; Keiichi Kanatani, Hirakata; Masato Osumi, Osaka; Hajime Hayama, Nara, all of Japan

[73] Assignee: Sanyo Electric Co. Ltd., Osaka, Japan

[21] Appl. No.: 872,997

[22] Filed: Jan. 27, 1978

[30] Foreign Application Priority Data

Feb. 8, 1977 [JP] Japan ............................. 52/15257[U]

[51] Int. Cl.² ................................................ F24J 3/02
[52] U.S. Cl. ..................................... 126/443; 138/114; 165/178
[58] Field of Search ................. 126/270, 271; 138/114; 220/420, 421, 423; 285/158, 286; 165/178; 29/157.4

[56] References Cited

U.S. PATENT DOCUMENTS

| | | | |
|---|---|---|---|
| 1,946,184 | 2/1934 | Abbot | 126/271 |
| 1,989,999 | 2/1935 | Niederle | 126/271 |
| 4,059,093 | 11/1977 | Knowles et al. | 126/271 |

Primary Examiner—James C. Yeung
Attorney, Agent, or Firm—Darby & Darby

[57] ABSTRACT

A solar heat collecting apparatus which may realize improvements in workability in the manufacturing process, easier handling in transporation and installation, and lower manufacturing and handling costs, and which comprises an outer tube of transparent glass, a heat collecting tube disposed therein of which the inside is formed as a passage for a heating medium, and metallic end plates for hermetically closing the space between said heat collecting tube and each of the end open portions of said outer tube, one of said end plates provided with an exhaust tubulure.

11 Claims, 5 Drawing Figures

SOLAR HEAT COLLECTING APPARATUS

BACKGROUND OF THE INVENTION

In a conventional solar heat collecting apparatus for absorbing solar heat energy, as shown in FIG. 1, a heat collecting tube 2 the inside of which is formed as a passage for a heating medium, is disposed in an outer tube 1 of transparent glass, and the spaces between the heat collecting tube 2 and the end open portions of the outer tube 1 are hermetically closed by glass end plates 3, each to which a metallic support tube 3' is disposed, and a glass exhaust tubulure 4 provided at the circumferential surface of the outer tube 1 is exhausted and calcined so as to be sealingly closed.

In such an arrangement to provide the relatively long glass outer tube 1 with the glass exhaust tubulure 4 requires troublesome work, and the exhaust tubulure 4 is susceptible to breakage because this tubulure 4 projects from the circumferential surface of the outer tube 1.

In addition to high manufacturing cost, thus manufactured solar heat collecting apparatus with the heat collecting tube 2 and the end plates 3 mounted requires very careful handling in transportation and installation, thus resulting in high handling cost.

It is an object of the present invention to provide a solar heat collecting apparatus in which an exhaust tubulure is provided at one of metallic end plates hermetically closing the end open portions of an outer tube of tranparent glass, thus reducing manufacturing cost.

It is another object of the present invention to provide a solar heat collecting apparatus which is easily handled.

It is a further object of the present invention to provide a more reliable and longer lifetime solar heat collecting apparatus in which provision is made for preventing damages to the exhaust tubulure and for strengthening the exhaust portion.

It is still another object of the present invention to provide a solar heat collecting apparatus in which various members may be hermetically sealed easily.

DETAILED DESCRIPTION OF THE INVENTION

Figure 1:
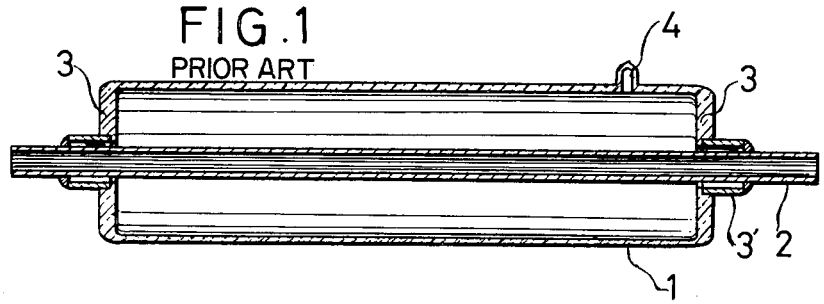
FIG. 1 is a sectional view of a conventional solar heat collecting apparatus.
Figure 2:
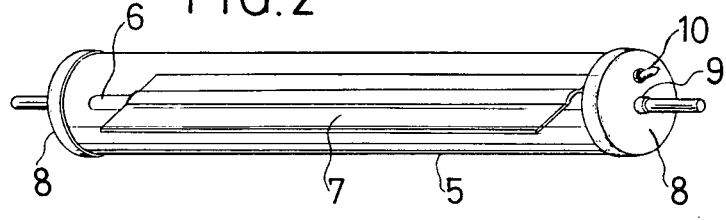
FIG. 2 is a perspective view of a first embodiment of a solar heat collecting apparatus in accordance with the present invention.
Figure 3:
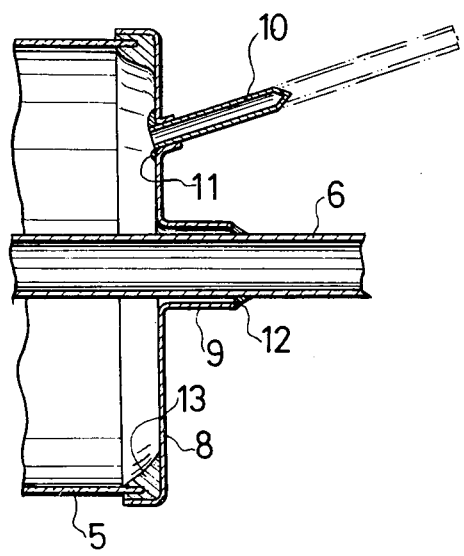
FIG. 3 is an enlarged sectional view of main portions in FIG. 2.

Description of a solar heat collecting apparatus in accordance with the present invention is made with reference to FIGS. 2 and 3.

In FIGS. 2 and 3, an outer tube 5 having open ends may be made of transparent soda glass, and a heat collecting tube 6 made of, for example, copper or copper alloy is disposed coaxially with the outer tube 5 therein and the inside of this heat collecting tube 6 is formed as a passage for a heating medium such as water or ethylene glycol.

A heat collecting fin 7 is thermally contacted to the heat collecting tube 6. Metallic end plates 8 are disposed for closing the space between each of the open end portions of the outer tube 5 and the heat collecting tube 6, and may be made of material which has a thermal expansion coefficient approximately equal to that of the outer tube 5 and is able to be fused to the outer tube 5 by flux of powdery glass, such as a Ni-Cr-Fe alloy.

Cylindrical support member 9 is projected from the center of the end plate 8 and formed integrally therewith.

An exhaust tubulure 10 made of metal, for example, copper is hermetically sealed to either end plate 8 by silver solder 11. The tip of the cylindrical support member 9 is hermetically sealed to the heat collecting tube 6 by silver solder 12. The outer tube open ends are fused to the end plate peripheries by flux of powder plumbic oxide glass.

Description will then be made of a manufacturing process of said first embodiment.

The heat collecting tube 6 to which the heat collecting fin 7 is mounted, is disposed in the outer tube 5, and is inserted, at both ends thereof, into the support members 9 of the end plates 8 to one of which the exhaust tubulure 10 has been hermetically sealed. Support members 9 are sealed to the heat collecting tube 6 by silver solder 12, and each of the outer tube open ends is fused to each of the end plate peripheries by flux 13.

The exhaust tubulure 10 is then connected to a vacuum pump, and the inside of the outer tube 5 is exhausted and evacuated, and inert gas may be enclosed therein as necessary. Thereafter, the exhaust tubulure 10 is hermetically closed at its appropriate portion so as to maintain the inside of the outer tube 5 airtight.

In thus described arrangement, the outer tube 5, even though relatively long, may be readily handled since the exhaust tubulure 10 is not disposed at the outer tube 5, and the end plate 8 to which the exhaust tubulure 10 is attached, is of relatively small size, thus providing easy attachment of the exhaust tubulure thereto and easy handling thereof. Furthermore, the outer tube 5 may be fused to the end plate by powdery glass, which may be carried out at relatively lower temperatures, thus producing no thermal deformations on the outer tube 5, which consequently results in easy sealing operation and lower manufacturing cost.

Moreover, because the breakable exhaust tubulure 10 is disposed at the end plate 8 and, after hermetically closed, lies within the range of the outer diameter of the outer tube 5 in thus manufactured solar heat collecting apparatus, there is little possibility that the exhaust tubulure 10 may be broken, and subsequently transportation and installation may be easily handled. In addition, the end plates 8 made of metal may increase breaking strength as compared with those made of glass.

Figure 4:
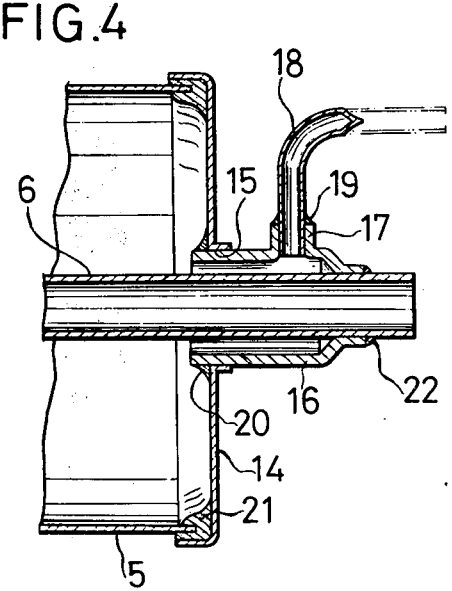
FIG. 4 is an enlarged sectional view of main portions of a second embodiment of a solar heat collecting apparatus in accordance with the present invention.

Description of a second embodiment of a solar heat collecting apparatus in accordance with the present is made with reference to FIG. 4, in which an end plate is formed with an end plate member and a support tube. In FIG. 4, a thin end plate member 14 may be made of metal similar to that of the end plate 8 in FIG. 3, and is provided with a hole 15 at the center thereof. A thick support tube 16 may be made of metal, such as, copper, copper alloy or stainless steel, and the slender tip portion of the support tube 16 may be formed so as to contact the external surface of the heat collecting tube 6. A branch tubulure 17 is integrally formed with the support tube 16. An exhaust tubulure 18 made of metal, such as, copper, may be hermetically sealed to the branch tube 17 by silver solder 19. The base of the support tube 16 is hermetically sealed into the hole 15 of the end plate member 14 by silver solder 20. Each of the outer tube open ends is fused to each of the end plate member peripheries by flux 21 of powdery glass. The slender tip portion of the support tube 16 is hermeticaly sealed to the heat collecting tube 6 by silver solder or phosphorus copper solder.

Description is made of the manufacturing process of the second embodiment.

The exhaust tubulure 18 is hermetically sealed to the support tube 16 by silver solder 19 and the base of the support tube 16 is hermetically sealed into the hole 15 of the end plate member 14 by silver solder 20. The heat collecting tube 6 is then inserted into the support tube 16 to which the end plate member 14 has been attached. Each of the outer tube open ends is fused to each of the end plate member peripheries by flux 21. Thereafter, the slender tip portion of the support tube 16 is hermetically sealed to the heat collecting tube 6 by silver solder or phosphorus copper solder. Likewise the first embodiment shown in FIG. 3, the exhaust tubulure 18 is exhausted and hermetically closed. The solar heat collecting apparatus shown in FIG. 4 may accordingly realize lower manufacturing and handling costs as the first embodiment shown in FIG. 3.

Furthermore, because the thick support tube 16 is hermetically sealed to the thin end plate member 14 and to the heat collecting tube 6, the end plate member 14 may also be hermetically sealed securely to the heat collecting tube 6, and thermal expansion due to difference between thermal expansion coefficients of the outer tube 5 and the heat collecting tube 6 may be absorbed by the thin end plate member 14.

In addition, the exhaust tubulure 18 may hardly be broken even though subjected to external force, because the exhaust tubulure 18 is hermetically sealed to the thick support tube 16. The tip portion of the support tube 16 and the heat collecting tube 6 may be made of copper or copper alloy, and may be hermetically sealed to each other by phosphorus copper solder, instead of silver solder in which corrosive flux has been used, thus producing no corrosive troubles due to flux residual in the outer tube 5 and consequently preventing the decrease in the degree of vacuum.

It should be understood that the tip of the support tube 16 may be hermetically sealed to the heat collecting tube 6 by wax or welding.

Figure 5:
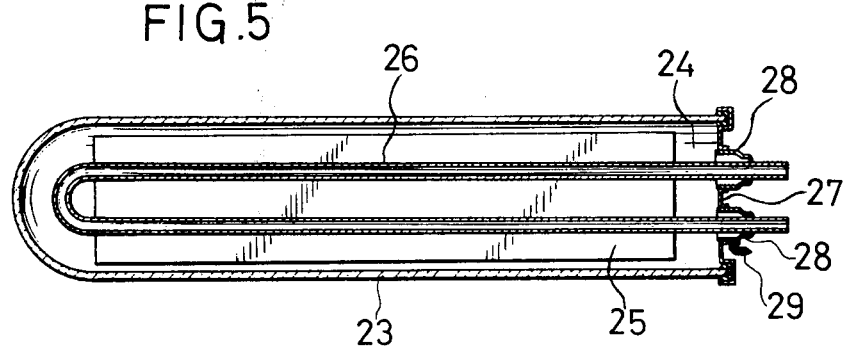
FIG. 5 is a sectional view of a third embodiment of a solar heat collecting apparatus in accordance with the present invention.

Description of a third embodiment of a solar heat collecting apparatus in accordance with the present invention is made with reference to FIG. 5.

In this embodiment, a transparent glass outer tube 23 with one end closed is used. A U-shaped tube 26 to which heat collecting fin 25 is attached, may be inserted into the open end 24 of the outer tube 23, and the open end 24 may then be sealingly closed by a metallic plate 27.

In FIG. 5, support tubes 28 and an exhaust tubulure 29 are provided.

What is claimed is:

1. A solar heat collecting apparatus comprising:
   an outer transparent tube having at least one open end;
   a heat collecting tube having a passage therethrough disposed within said outer tube;
   an end plate at each of said at least one open ends having a support tube portion affixed at one of its ends to an end plate member portion,
   each of said end plate member portions arranged transverse to said outer tube, the periphery of each of said end plate member portions hermetically sealed to said outer tube,
   the inner diameter of each of said support tube portions being sufficiently larger than the outer diameter of said heat collecting tube so that when said collecting tube is disposed within each of said support tube portions a gap exists between said collecting tube and each of said support tube portions, the opposite end of each of said support tube portions being hermetically sealed to said heat collecting tube so that the inner surface of said outer tube, the outer surface of said heat collecting tube and the inner surface of each of said end plates together define a hermetically sealed region; and
   exhaust means on at least one of said end plates for exhausting and hermetically sealing said region.

2. The apparatus of claim 1 wherein each of said support tube portions comprises a cylinder.

3. The apparatus of claim 1 wherein each of said end plates comprises a metallic end plate.

4. The apparatus of claim 1 wherein the periphery of each of said end plate member portions extends substantially parallel to the longitudinal axis of said outer tube along the external surface of said outer tube.

5. The apparatus of claim 1 wherein said exhaust means comprises an exhaust tubulure located within the range of the outer diameter of said outer tube after said tubulure is sealingly closed.

6. The apparatus of claim 5 wherein said exhaust tubulure is disposed on at least one of said end plate member portions.

7. The apparatus of claim 5 wherein said exhaust tubulure is disposed on at least one of said support tube portions.

8. The apparatus of claim 1 further comprising glass means for hermetically sealing the periphery of each of said end plate member portions to said outer tube.

9. The apparatus of claim 1 wherein each of said end plate member portions comprises a thin and resilient metallic plate, and each of said support tube portions comprises a thick metallic cylinder, said exhaust means being disposed at one of said support tube portions.

10. The apparatus of claim 1 wherein each of said end plate member portions comprises a metallic plate having a thermal expansion coefficient substantially equal to that of said outer tube.

11. The apparatus of claim 1 wherein each said end plate comprises a unitary construction of said end plate member portion and said support tube portion.

* * * * *